United States Patent
Schoenberg

(10) Patent No.: US 8,751,389 B2
(45) Date of Patent: Jun. 10, 2014

(54) METHOD AND SYSTEM TO PROCESS PAYMENT USING SMS MESSAGING AND A MOBILE-OPTIMIZED WEB FORM

(71) Applicant: Douglas Schoenberg, Villanova, PA (US)

(72) Inventor: Douglas Schoenberg, Villanova, PA (US)

(73) Assignee: Softerware, Inc., Horsham, PA (US)

( * ) Notice: Subject to any disclaimer, the term of this patent is extended or adjusted under 35 U.S.C. 154(b) by 0 days.

(21) Appl. No.: 13/948,075

(22) Filed: Jul. 22, 2013

(65) Prior Publication Data

US 2013/0304638 A1    Nov. 14, 2013

Related U.S. Application Data

(63) Continuation-in-part of application No. 13/305,392, filed on Nov. 28, 2011, now Pat. No. 8,494,958.

(51) Int. Cl.
*G06Q 40/00* (2012.01)
*G06Q 20/32* (2012.01)

(52) U.S. Cl.
CPC .............. *G06Q 20/32* (2013.01); *G06Q 20/325* (2013.01); *G06Q 20/3255* (2013.01)
USPC ............................................. 705/40; 705/35

(58) Field of Classification Search
CPC .. G06Q 20/32; G06Q 20/325; G06Q 20/3255
USPC ....................................... 705/34, 40; 709/229
See application file for complete search history.

(56) References Cited

U.S. PATENT DOCUMENTS

| | | | |
|---|---|---|---|
| 6,976,077 B1 * | 12/2005 | Lehew et al. ................. | 709/229 |
| 2002/0194127 A1 * | 12/2002 | Randell et al. ................. | 705/40 |
| 2003/0191701 A1 * | 10/2003 | Haseltine et al. ............. | 705/34 |
| 2003/0208441 A1 * | 11/2003 | Poplawski et al. ............ | 705/40 |
| 2004/0143546 A1 * | 7/2004 | Wood et al. .................... | 705/40 |
| 2005/0033690 A1 * | 2/2005 | Antognini et al. ............. | 705/40 |
| 2008/0306846 A1 * | 12/2008 | Ferguson ....................... | 705/34 |

* cited by examiner

*Primary Examiner* — Samica L Norman
(74) *Attorney, Agent, or Firm* — Perry M. Fonseca

(57) ABSTRACT

Provided is a method and system for processing payment/information, including receiving, by an electronic circuit of a mobile communication device, a payment/information processing statement for a customer by a short message service (SMS) message, the payment/information processing statement including an online payment/information URL personalized to uniquely identify the customer. Next, the online payment/information URL is extracted from the SMS, and a mobile-optimized web page is accessed using the online payment/information URL. A customer's online payment/information form is then received and completed by the customer, then forwarded to a secure payment form server.

10 Claims, 9 Drawing Sheets

METHOD AND SYSTEM TO PROCESS PAYMENT USING SMS MESSAGING AND A MOBILE-OPTIMIZED WEB FORM

CROSS-REFERENCE TO RELATED APPLICATIONS

This application is a Continuation-In-Part of and claims priority from U.S. patent application Ser. No. 13/305,392 for "METHOD AND SYSTEM TO PROCESS PAYMENT USING URL SHORTENING AND/OR QR CODES", filed on Nov. 28, 2011 by Douglas Schoenberg, which is a Continuation-In-Part of U.S. patent application Ser. No. 12/215,122 for "METHOD AND SYSTEM TO PROCESS PAYMENT", filed on Jun. 25, 2008 by Douglas Schoenberg.

FIELD OF THE INVENTION

This invention generally relates to a method and system of payment processing, and, more particularly, to a method and system of improving and extending the use of personalized hyperlinks for online payments and other online constituent interactions.

BACKGROUND OF THE INVENTION

Many payments, such as but not limited to those for child care, donation pledge commitment, membership renewals and other types of non-profit financial transactions are presently still made by check. Current processes of billing for and collecting such payments are often inconvenient, for both the payer and the collecting organization. Attempts to introduce more automated means of payments, such as preauthorized credit card and direct bank debit (ACH) payments, have had limited success due at least in part to the reluctance of payers to trust and agree to such methods.

Many systems for online payment require payers to login to an online system to display charges and make payment. This requires payers to register, remember login information and generally reduces the likelihood that payers will utilize such a system. Other systems that don't require a login typically require the payer to enter all of the data each time they wish to make a payment. Entry of data each time increases the likelihood of entry error. Errors in entry may incur extra costs for declined or unsuccessful transactions and increase payer frustration. Entry errors are especially problematic for ACH payments where there is currently no system for real-time validation of the account information entered, and where the necessary bank routing and account numbers are potentially difficult for the payer to be certain of.

Thus, there is a need to adapt numerous new and evolving technologies to provide a much simpler method of allowing payers to initiate one-time and recurring payments by credit card or ACH payment with a minimum of effort. This method would also increase payer confidence so that organizations could encourage payers to more readily sign-up and transition to preauthorized collection of payments due.

Use of a token, including use of a personalized hyperlink or secure URL, is taught by U.S. patent application Ser. No. 12/215,122 for "METHOD AND SYSTEM TO PROCESS PAYMENT", filed on Jun. 25, 2008 by Douglas Schoenberg. It would be beneficial in the method and system presented by this application to hide the data being passed as part of the secure URL and to generate a short and simple code that represents the underlying data.

SUMMARY OF THE INVENTION

An aspect of the present invention provides a payment processing method and system, including emailing a billing statement to a payer by a biller, the billing statement including an online payment hyperlink. The online payment hyperlink includes a URL personalized for the payer and a token uniquely identifying the payer, as well as other data, such as amount due and data to facilitate proper posting, such as accounting codes. The online payment hyperlink is then selected by the payer, who is then presented with the biller's online payment form. The online payment form includes data fields pre-populated with available payer information included in the link or stored and associated with the payer token. The biller's online payment form is then reviewed by the payer, who completes and corrects the data as needed. The completed online payment form is then sent to a secure payment form server by the payer.

In one aspect of the invention, the payer payment data is transmitted to an online payment gateway by the secure payment form server, and payment is processed by the online payment gateway.

In another aspect of the invention, the online payment gateway's the payment processing includes accessing a secure data vault to obtain payer payment information, transmitting payer payment information to a credit/debit card network, receiving a transaction record from the credit/debit card network, updating the form server data vault with the transaction-record information, and updating the payer's available payer information in the secure data vault.

In one aspect of the invention, the payer is presented with an option to authorize saving payment data to a hosted secure server, the payer then authorizes the saving of payment data, and the data is saved to a secure data vault.

In another aspect of the invention, the payer is presented with an option to authorize automatic recurring payments to the biller, and authorizes such payments. This aspect of the invention includes a method for recording an electronic signature of authorization.

In one aspect of the invention, the biller, may request email payment notices be sent to the biller's organizational contact and/or to the payer. With this option, an email notice is sent to biller's organizational contact and/or the payer upon payment completion.

Another aspect of the invention includes the biller's organizational contact logging into the hosted secure form server and downloading the completed transaction records.

In another aspect of the invention, the biller may process additional one-time payments initiated in person or by phone utilizing the same payer token to reduce data entry and speed payment processing.

In another aspect of the invention, certain data such as the biller specified G/L accounting codes, unique payer identifier, etc. are passed to the payment form but not displayed. This allows them to be recorded as part of the payment transaction to facilitate better handling of the data when imported back into the organization's accounting system.

In another aspect of the invention, the online payment forms are easily customized to include the billing organization's logo, website color scheme, instructions, security graphics, and other elements to ensure payer confidence in providing sensitive credit card or bank account data.

In another aspect of the invention, URL shortening technology is used to both hide the data being passed as part of the secure URL and generate a short and simple code that represents the underlying data. This makes the URL address easier to remember and enter into a web browser.

Another aspect of the invention provides the ability to use Quick Response (QR) bar codes containing the personalized URL data, in order to increase data security.

Another aspect of the invention provides a system and method, for payment/information processing. An electronic circuit of a mobile communication, device receives a payment/information processing statement for a customer by a short message service (SMS) message—the payment/information processing statement includes an online payment/information URL personalized to uniquely identify the customer. Next, the online payment/information URL is extracted from the SMS message, and a mobile-optimized web page is accessed using the online payment/information URL. A customer's online payment/information form is then received and displayed on the mobile communication device—without the customer logging in or preregistering. The online payment/information form includes data fields pre-populated with available customer information derived from the online payment/information URL. After completing the online payment/information form, the completed online payment/information form is sent to a secure payment form server.

In one aspect of the invention, the payment/information processing further includes forwarding a payment from the customer to a biller.

In another aspect of the invention, a customer information database is updated with customer data.

Another aspect of the invention provides for registering financial payment information. An electronic circuit of a mobile communication device receives a mobile-optimized financial payment information form for a customer, which is then filled in by the customer with financial payment information, such as but not limited to credit card information. Next, the financial payment data is posted to a secure gateway for validation, and, upon validation, a personalized URL associated with the customer and validated financial payment data is received by the electronic circuit of the mobile device.

In a further aspect, the personalized URL may then be sent, for example by email or an SMS message, to a payee to render payment.

DETAILED DESCRIPTION

Figure 1:
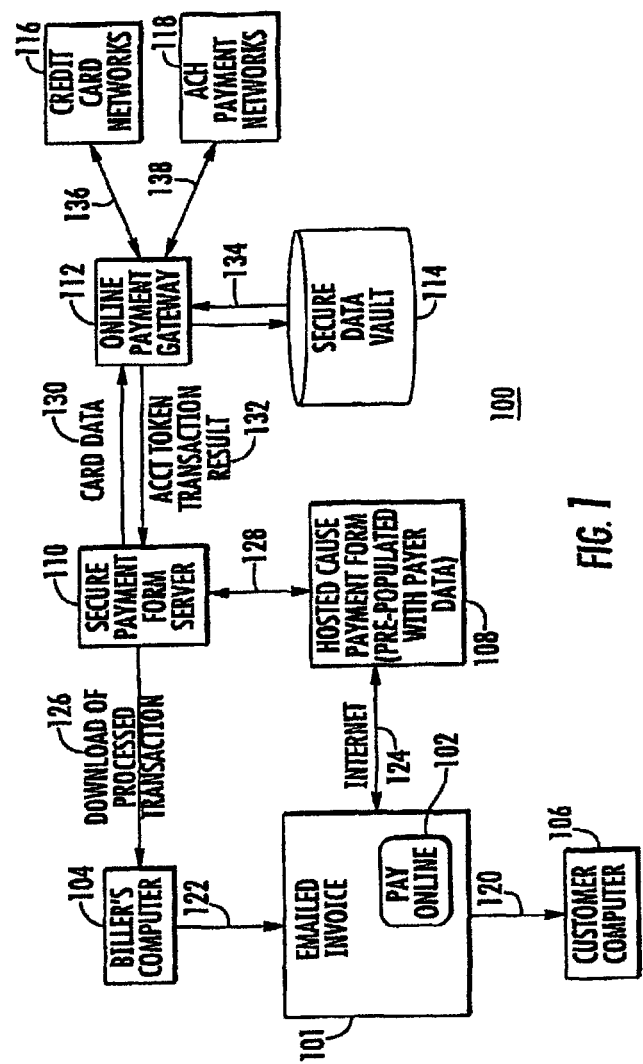
FIG. 1 is a schematic diagram illustrating a payment processing system, in accordance with an embodiment of the present invention.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known, features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The term "payer" referred to in the descriptions of various embodiments of the invention herein described is intended to generally describe any person or company having a need or desire to make a payment to any biller, or perform another activity, without limitation. Typically, a payer is a private individual, but it may alternatively be a public or private entity, such as a company, partnership or corporation. Use of the term "payer" is not intended to limit the activities performed or initiated by the payer. For example, in an implementation of the present invention the payer may access their stored personal data to review and/or make changes, without actually making any payment.

As used herein, the terms "biller" refers to any entity desiring to solicit payment from any payer, or collect updated information from any payer, without limitation. Examples of billers are charities, service providers, retail and wholesale businesses, utilities, etc.

As used herein, the terms "computer" or "computer system" refers to any commonly used computer device having at least a processor, associated memory, and one or more input device, without limitation. The computer may be within the biller's office, or one used, or accessed remotely to host the biller's accounting applications. Examples of computers include, but are not limited to, desktop computers, laptop computers, minicomputers, mobile devices, cellular telephones, and others. It is assumed all computers described herein incorporate an appropriate operating system, any additional necessary software and any necessary communication interfaces.

The term "credit card", as used herein in connection with systems, networks or transactions, is understood to include other similar systems and transactions clearly and expressly limited in scope. Thus, a description including the use of 'credit card processing network' includes debit card processing networks as well as electronic check processing networks (ACH).

Similarly, communication between system elements, for example, in figure item nos. 120, 122, 124, 126, 128, 130, 132, 134, 136, and 138, is assumed to be over conventional communication lines and interfaces, without limitation.

The present invention advantageously provides a streamlined payment process and system allowing payers to authorize payments without needing to login, thereby eliminating the need for the payer to remember a user id and password. It also advantageously provides for minimizing the data that must be entered by the payer to make a payment.

The present invention also advantageously provides for billers and payers to be assured that their correct balance due or donation amount is paid.

The present invention also advantageously provides for secure storage of payer account data for both credit and debit cards and ACH.

The present invention also advantageously provides a save process and authorization form to encourage preauthorized recurring payments or donations.

The present invention also advantageously provides a method of handling credit card data that meets credit card security standards, such as PCI and CISP standards.

The present invention also advantageously provides a method of uniquely identifying the payer so that a completed payment transaction can be automatically associated with the correct payer account including any desired payment or accounting classification.

The present invention also advantageously provides for using URL shortening technology to both hide data being passed in a secure URL and to generate a simple code that represents the underlying data. URL shortening is a technique on the World Wide Web in which a URL may be made substantially shorter in length and still direct, to the required page. This may be achieved by using an HTTP Redirect on a domain name that is short, which links to the web page that has a long URL. This is especially convenient for messaging technologies such as Twitter and Identi.ca, which severely limit the number of characters that may be used in a message. Shortened URLs allow otherwise long web addresses to be referred to in a tweet. Techniques for generating shortened URLs are well known in the art, and there is thus not need to describe these in greater detail herein. For example, see: http://en.wikipedia.org/wiki/URL_shortening.

The present invention also advantageously provides for generation and use of a Quick Response (QR) code containing personalized secure URL data, which is particularly useful when used with modern mobile devices.

The present invention also advantageously provides for the use of Short Message Service (SMS) messages to transmit personalized payment and/or information hyperlinks for the use of mobile-optimized web forms to facilitate payment or updating of customer information.

FIG. 1 depicts and exemplary payment processing system 100. In an embodiment of the invention, a biller's computer 104 sends an emailed invoice 101 to the payer's computer 106. It is understood that biller's computer 104 and payer's computer 106 may be any type of computer system, including personal computers and even other electronic devices enabled to communicate with other systems. Transmission 122, 120 of the emailed invoice from the biller's computer 104 to the payer's computer 106 also may be by any common communication interface, such as via internet email.

The emailed invoice 101 preferably includes a "pay online" hyperlink 102, with a personalized URL including a "token" or other data that uniquely identifies the payer, not depicted. The "token" or other data may include any information and is intended to pre-populate the online payment form fields and provide a key for obtaining stored payer information. The hyperlink 102 may also include data such as the biller's desired general ledger accounting code for the payments.

Also in an embodiment, when the payer selects the "pay online" hyperlink, a payment form 108 is provided having some or all fields of the form 108 pre-populated by a secure payment form server 110. The degree of pre-population of the payment form 108 is determined by the amount of payer information available as part of the URL, from previous transactions, or stored in the secure data vault accounting with the token.

The payer then may review the pre-populated data on the payment form 108, correct, update, and/or add missing information. At this point, the payer can enter payment information onto the payment form 108, such as credit card, debit card, bank account or other payment information. As discussed further below, in an embodiment of the invention, the payer's payment information may have already been provided in the pre-populated payment form 108 by the secure payment form server 110, if the payer had previously approved storing of the data.

Once the payment form 108 has been reviewed and, if necessary, corrected or completed by the payer to include payment method information, the payer can submit the payment form 108 via the secure payment form server 110, with the payment or card data 130 and other information being sent to an online payment gateway 112, and thereon onto a credit or debit card network 116, direct debit (ACH) network 118 or other payment processing network (not depicted), as appropriate. The online payment gateway 112 is also communicatively connected 134 with a secure data vault 114, which may be used to record payment processing information.

In a preferred embodiment of the invention, a browser redirect technique is used whenever payment information is to be collected so that data is being entered directly on the gateway payment server rather than the form server. In this way the form server never directly processes or transmits the card data, thus eliminating a potential point of PCI ("Payment Card Industry") compliance failure.

Once the payment has been processed by the online payment gateway 112, a transaction record and an updated account "token" or other data is passed 132 back to the secure payment form server 110, from which the processed transaction information is downloaded 126 by the biller's computer 104. This updated account token or other data is also used by the secure payment form server to provide subsequent pre-populated information for the payment form 108 when needed. The token data stored in the biller's computer and associated with a particular payer can also be used by a recurring billing system and/or by a "virtual terminal" for additional one-time staff-processed payments.

Figure 2A:
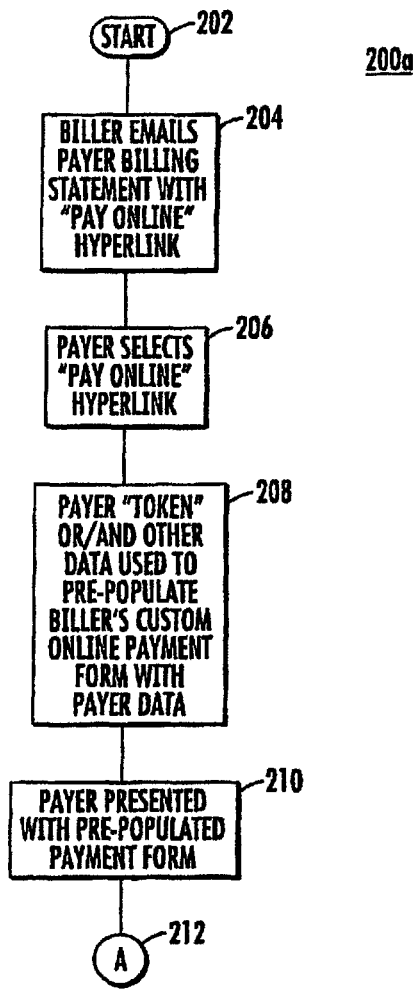
FIG. 2(a) is a flowchart depicting a method of payment processing, in accordance with an embodiment of the present invention.

FIG. 2(a) is a flowchart depicting an exemplary method 200a of payment processing. In accordance with an embodiment of the present invention, the process begins 202 when the biller emails the payer a billing statement with an embedded "pay online" hyperlink 204. Although the present invention in this embodiment is described with reference to a "billing statement", it is understood that other communications and/or donation solicitations may alternatively be used. The payer then selects the "pay online" hyperlink 206, and the payer's token or other data is used to pre-populate the biller's custom online payment form 108 with payer information 208, which is then presented to the payer 210.

Figure 2B:
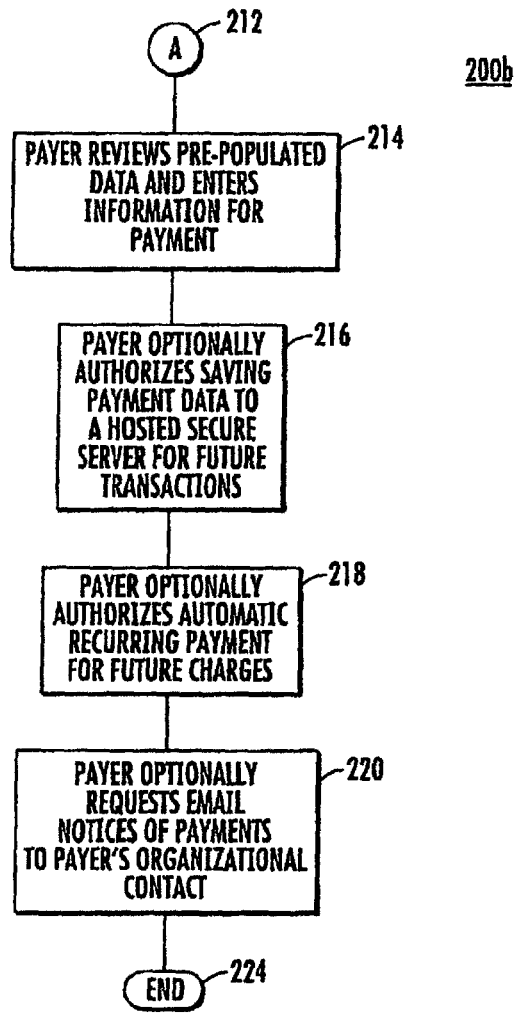
FIG. 2(b) is a flowchart depicting a method of payment processing, in accordance with an embodiment of the present invention.

Continuing with FIG. 2(b), in an embodiment of the invention, the payer next reviews the pre-populated data and provides information for payment, such as credit card, debit card or banking account information 214. If the payer has previously used the system with the biller, and if the payer has authorized the biller to retain payment information, the payment information may already be pre-populated on the payment form 108, in which case the payer needs only to review the information and authorize payment.

In addition, in an embodiment of the invention, the payer is presented with an option to specify saving payment data to a secure hosted server for future transactions 216. In another embodiment, the payer is presented with an option to authorize automatic recurring payment for future charges 218.

In one embodiment of the invention, the biller is provided with an option to request that email notices of payments be sent to the biller's organizational contact 220 and/or the payer's email address.

Figure 3:
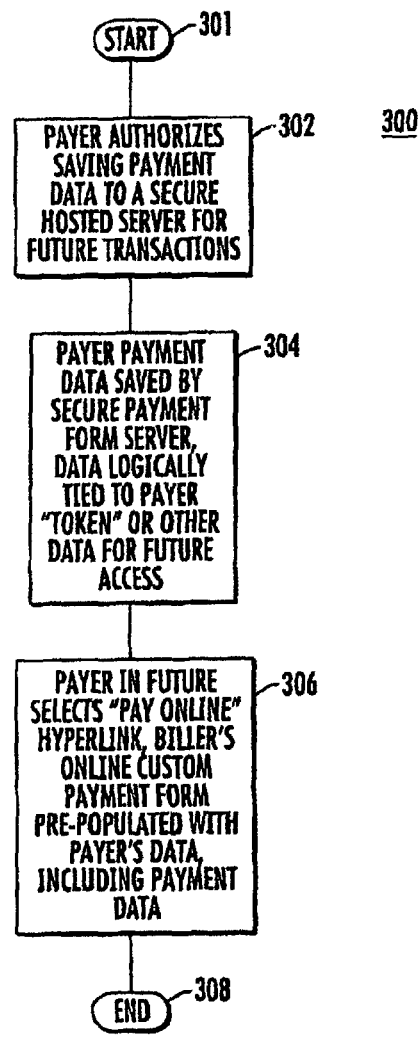
FIG. 3 is a flowchart depicting a method of payment processing including optional authorization of saving payment data, in accordance with an embodiment of the present invention.

FIG. 3 is a flowchart 300 depicting an exemplary method of payment processing including optional authorization of saving payment data. In accordance with an embodiment of the present invention, the method begins 301 when the payer authorizes the saving of payment data to a secure hosted server for future transactions 302. Next, a token that is logically associated with payer's account data is generated and sent to the secure form server 110 for downloads to biller's accounting system, and future use.

Subsequently, the next time the payer selects the "pay online" hyperlink for the biller, the biller's online payment form is populated with the payer's data, including the payer's payment data 306.

Figure 4A:
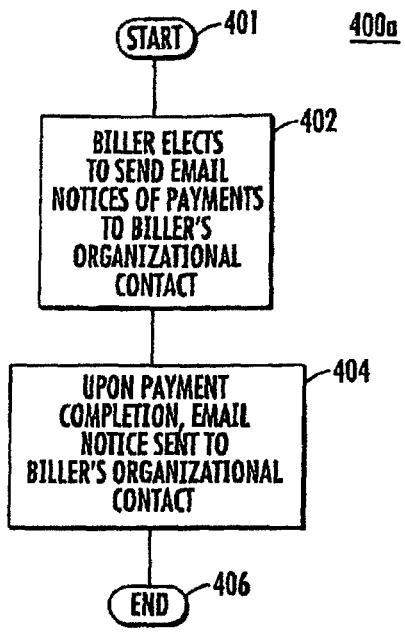
FIG. 4(a) is a flowchart depicting a method of payment processing including provision of email payment notices, in accordance with an embodiment of the present invention.

FIG. 4(a) is a flowchart depicting an exemplary method of payment processing including provision of email payment notices. In accordance with an embodiment of the present invention, the method starts 401 when the biller requests that email notices of payments be sent to the biller's organizational contact 402. This request may be made by various means, such as by an input field on the payment form 108, by an input field on another biller-provided form or web page, by prior agreement such as a contract, or by any other means, without limitation.

After the payer completes payment the email notice(s) are emailed to the biller's organizational contact and payer's email 404.

Figure 4B:
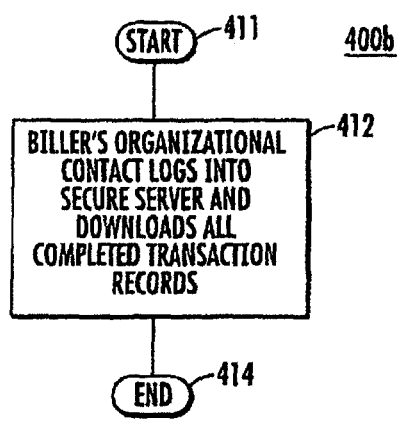
FIG. 4(b) is a flowchart depicting a method of payment processing including downloading of completed transaction records by a biller's organizational contact, in accordance with an embodiment of the present invention.

FIG. 4(b) is a flowchart depicting an exemplary method of payment processing including downloading of completed transaction records by a biller's organizational contact. In accordance with an embodiment of the present invention, a biller's authorized organizational contact may log into the secure server and download all or specific payers' completed transaction records. In an embodiment of the invention the transaction records include the payer's "token", as well as data such as a passed general ledger accounting code.

The following is an example of a system embodying some aspects of the present invention, CLICK-TO-PAY™. It is described herein for illustrative purposes only.

CLICK-TO-PAY™ provides a "smart" pay online link in billing statements that are emailed to customers. The pay online link includes personalized URL which includes a token and/or other data that uniquely identifies the payer. The link takes the payer to the organization's customized online payment form and transmits the token and other data to the payment form so that stored information about the payer can be used to pre-populate fields such as name, address, payment amount, etc. This method can also be used to pass other data such as the appropriate general ledger or accounting code to associate with the payment transaction.

With all or most of the payers data pre-populated onto the payment form, the payer needs only to review that the data is correct and enter the data for the credit card or other method of payment. Even the need to enter the credit card or bank account data can be eliminated via CLICK-TO-PAY™'s option to save the account data to a hosted secure server for use in future transactions. In addition, once payers elect to save the account data, the CLICK-TO-PAY™ payment form can be configured to offer the payer the option to authorize automatic recurring payment for future charges.

CLICK-TO-PAY™ also provides optional email notices to the biller and/or payer when payments have been completed. The organization's billing coordinator can log-in to the secure server to review all competed transactions and approve them for download. The download process is customized to create a file that is appropriately formatted for updating the organizations accounting system In an implementation of the invention, a method of improving and extending the use of personalized hyperlinks for online payments and other online constituent interactions is presented. The CLICK-TO-PAY™ system may use URL shortening technology to both hide the data being passed as part of the secure URL and generate a short and simple code that represents the underlying data. This makes the URL address easier to remember and enter into a web browser. URL shortening is commonly used to generate short URLs to accommodate the space limitations for messaging technology such as Twitter. In this implementation, the shortened URL is also being used to eliminate exposing payer information including the token within link.

Figure 6:
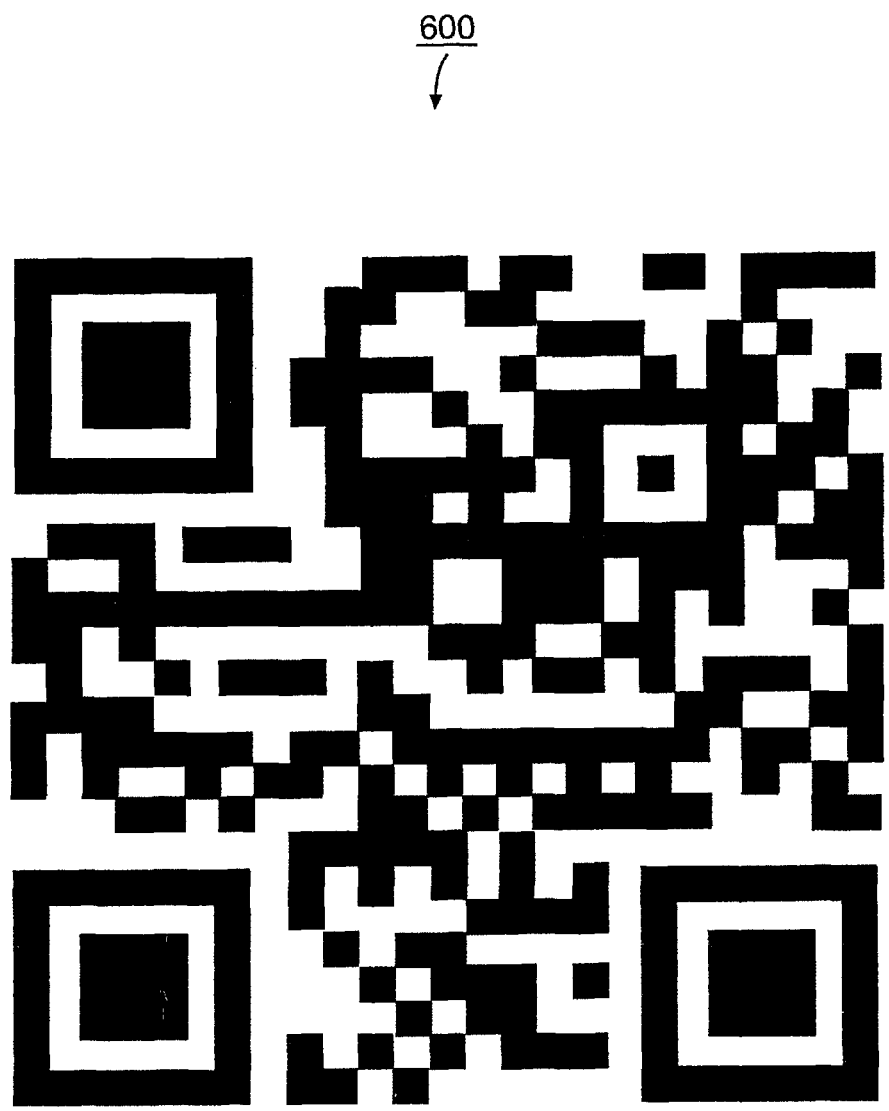
FIG. 6 is an exemplary QR code, which is useful to understanding an embodiment of the present invention.

In a further implementation, a Quick Response (QR) code may be used to further protect data security and remove the need for a payer to type in a URL or even shortened URL. QR codes are frequently used with mobile devices to direct people to a particularly website. FIG. 6 provides an exemplary sample 600 of a QR code. The rows and columns of black and white squares provide a condensed way to store information, which is also difficult for a human to meaningfully interpret without machine assistance.

In an embodiment of the invention, the CLICK-TO-PAY™ system may employ shorten URLs and/or QR codes to provide additional functionality, security and ease of use. In particular, the exemplary system provides additional protection for the data being conveyed, since the data does not need to directly be part of the URL. It also provides methods to communicate the personalized URL in printed and other non digital communications. This short URL or QR code not only contains the data that takes the payer to the online form, but also the reference information to identify the individual and pre-populate the form with the appropriate data. Thus, the exemplary system allows the dynamic retrieval of the individual's current information pertaining to the communication, e.g. current balance, or the like.

Use of a shortened URL and/or QR code provides numerous advantages, such as, but not limited to: greater data security, the ability to use the shortened URL/QR code in printed communications, shorter URLs are less likely to be truncated or miscopied and are easier to remember, the ability to pass an even greater amount of data for pre-population in a form, the ability to retrieve the most current data instead of static data. Use of a QR code in particular eliminates the need for a payer to type in a URL or shortened URL and speeds form access from mobile devices.

In another embodiment of the invention, QR codes may be used containing the personalized URL data to provide further data security and allow a payer to access and/or update their personalized data without the need to provide a login and password to access their information. For example, many organizations find it difficult to keep their records on payers up to date, particularly information such as email addresses, mailing addresses, and phone numbers. Very frequently payers do not notify the organization of changes and are not aware that the organization does not have current information. One approach to trying to keep the data updated is to provide payers a web-portal where they can review and update their data. This approach has several challenges. For example, the portals require a payer to register and establish payer names and passwords in order to access their information, which often discourages use and creates an additional administrative burden for the payer. This approach is particularly ineffective when the payer have very limited need or reason to access the portal.

In an embodiment of the invention, the same techniques of personalized URLs described herein are used to drive payers to web forms where their personalized data is pre-populated and conveniently displayed with the opportunity to correct and update it. In addition, the shortened URLs and/or QR codes may be employed, as well as intelligent links, to direct the payer to the form and identify the payer so that the form can be pre-populated with their most current data—again, without any need for login or payer authentication. This allows for the payer to be both notified and encouraged to update their information via both electronic and printed communications, eliminates the need to manage payer names and passwords, does not require the organization to build or integrate portal functionality on website or even have a website, provides the ability to present the payer with their most current data, as well as the ability to ensure that updated data is associated with the correct constituent. The use of a QR code eliminates the need to type the URL and speeds form access from mobile devices.

Figure 5:
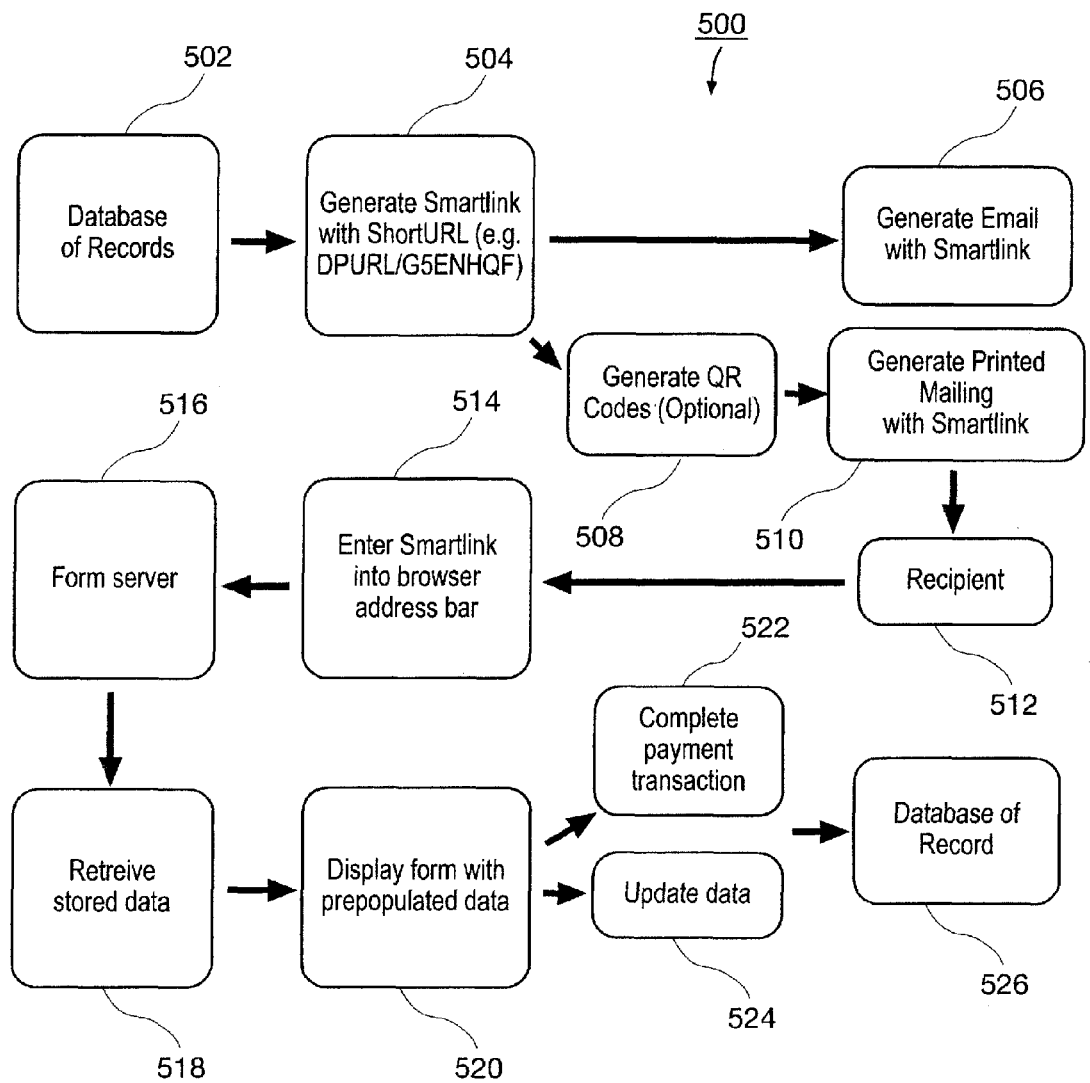
FIG. 5 is a flowchart depicting a method of payment processing including generation and use of a shortened URL and optional generation of QR codes, in accordance with an embodiment of the invention.

An exemplary method 500 of the present invention is presented in FIG. 5. In one implementation, a database of records 502 is accessed to generate 504 a hyperlink (also referred to as a Smartlink) with a shortened URL, such as "DPURL.COM/GSENHQF". Next, an email containing the Smartlink shortened URL is generated 506 and sent to the payer (also referred to as the "recipient"). Additionally or optionally, a QR code may be generated 508 and printed 510 and sent to the payer 512 as a printed mailing.

In a further step, the payer may enter the Smartlink shortened URL into their browser's address bar 514, or scan (not depicted) their QR code into their mobile device, such as by using a camera on the device in conjunction with specialized software—as is well known understood in the mobile device and software arts and thus need not be described in detail herein. The form server then receives 516 the shortened URL or QR code and retrieves the payer's stored data 518. The data may then be displayed to the payer with a pre-populated display form 520, which the payer can then use to complete the transaction 522, and/or to update their data 524, which is then saved 526 to the database of records.

In one exemplary method of payment processing, a payer is sent a billing statement by a biller. The billing statement includes an online payment hyperlink which includes a shortened URL personalized for the payer and a token uniquely identifying the payer. The payer then selects the online payment hyperlink and is subsequently presented with the biller's online payment form, without the payer having to log in or preregister. The online payment form would preferably include data fields pre-populated with available payer information derived from the personalized shortened URL and token. The online payment form is then reviewed by the payer, who completes and corrects the data as needed. The completed online payment form may then be sent to a secure payment form server by the payer, to complete the transaction.

In another exemplary method embodiment of the invention, a printed billing statement, donation solicitation or other communication is mailed to a payer/constituent/customer by a biller/organization. The billing statement includes a QR code which incorporates an online payment link including a shortened URL personalized for the payer, and a token uniquely identifying the payer. Next, the payer images the QR code using a mobile communication device including a camera and an electronic circuit controlling the device. Use of a mobile communications device is exemplary, and other devices may alternatively be employed. For example, a personal computer, laptop, notebook, tablet computer or other electronic having a camera and communication ability may also be employed, without limitation.

Regardless of the device used, the QR code is then decoded by the electronic circuit, and decoded QR code is then sent to a secure payment form server. Next, the payer is presented with the biller's online payment form on the mobile communication device. The online payment form includes data fields pre-populated with the available payer information derived from the personalized shortened URL and token. The payer may then review the online payment form by the payer, completing and/or correcting data as needed. The payer may then send the completed online payment form to the secure payment form server. In another embodiment of the invention, the payer may elect to simply correct data without authorizing a payment.

An embodiment of the invention presents an improved CLICK-TO-PAY™ using Short Message Service (SMS) or text messaging to transmit the personalized URL. This embodiment provides for the use of URL shortening to ensure that the URL does not exceed the 160 character limitation for SMS messages, while still allowing the URL to provide extensive personalization data to the web page. In some embodiments of the invention, the URL displays a form that has been optimized for viewing and use on a mobile device.

SMS is most commonly used to send messages between two parties. Mobile-optimized web pages are used to view information via a mobile device. The combined use of SMS and mobile-optimized web pages provides users of an embodiment of the inventive system and method with additional functionality, including: providing an additional convenient way to notify a customer or constituent of the need or opportunity to make a payment or update information; improving the convenience of making a payment or updating information since the short URL not only contains the data that takes the visitor to the mobile-optimized online form, but also includes the reference information to identify the individual and pre-populate the form with the appropriate data, thus eliminating the need to enter information via the normally smaller keyboard available on a mobile device; and, dynamically retrieving the individual's current information pertaining to the communication, such as, but not limited to, current balance.

The use of SMS messaging and mobile-optimized web pages also advantageously: provides for greater speed and convenience for customers, which leads to higher usage; is able to pass virtually unlimited data for pre-population in a form despite the character limitations of SMS; is able to retrieve the most current data instead of static data; may use QR codes to eliminate the need to type the URL, and speeds form access from mobile devices; and, there is still no need for a customer to login and remember passwords, and the like.

Figure 7:
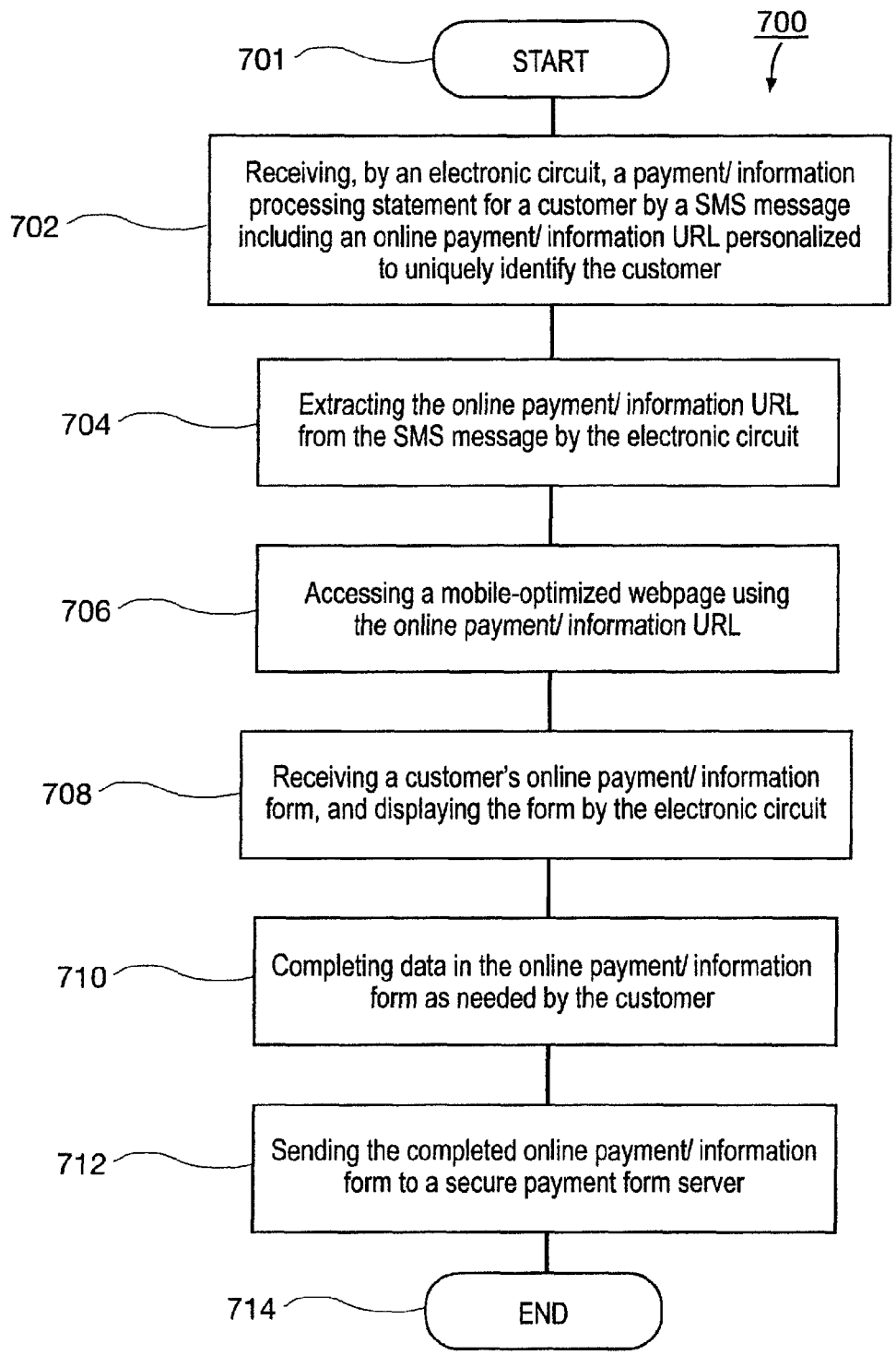
FIG. 7 is a flowchart depicting a method of using SMS messaging to transmit a personalized hyperlink for online payment and other online constituent interactions, which is useful to understanding an embodiment of the present invention.

In an exemplary embodiment depicted in FIG. 7, a payment/information processing method 700 is provided. The process begins with step 701 and proceeds to step 702, where an electronic circuit of a mobile communication device receives a payment/information processing statement for a customer by a short message service (SMS) message—the payment/information processing statement includes an online payment/information URL personalized to uniquely identify the customer. Next, at step 704 the online payment/information URL is extracted from the SMS message, and at step 706 a mobile-optimized web page is accessed using the online payment/information URL. A customer's online payment/information form is then received at step 708, and displayed on the mobile communication device—without the customer logging in or preregistering. The online payment/information form includes data fields pre-populated with available customer information derived from the online payment/information URL. After completing the online payment/information form by the customer at step 710, the completed online payment/information form is sent to a secure payment form server in step 712, completing 714 the process. In an embodiment of the invention, the payment/information processing further includes forwarding a payment from the customer to a biller.

In one embodiment of the invention (not depicted), a customer information database is updated with customer data.

Another embodiment of the invention presents the use of a personalized payment hyperlink to register credit card, bank account, or similar financial information for future use. This embodiment provides for improving and extending the use of personalized hyperlinks for online or mobile payments—i.e., payments made over a mobile communication device—and other online interactions. In one embodiment, this improvement over CLICK-TO-PAY™ provides an online or mobile-optimized form to collect credit card or other payment method data for future use. The payment method data is then posted to a secure gateway, where validation may be performed. After validation, the gateway returns a token that can be associated with the customer, such as with the data provided as part of the personalized or shortened URL. This payment token can then be used to initiate payment transactions at a future time.

For example, a common challenge at fundraising events, particularly those involving silent auctions, is the need to collect and process payments at the end of the event. This can result in long waits at checkout and unhappy customers. Overwhelmed and rushed staff members are also more likely to make errors. An embodiment of the invention eliminates the need to swipe or enter credit card data at the event, since the participants can pre-register their cards via CLICK-TO-PAY™ links sent to them by email or SMS message prior to the event.

The use of the personalized payment hyperlink to register financial payment means also provides numerous advantages, including: the ability to either automatically process payments for winning bids or send email or text messages to allow winners to approve the transaction; increased speed and convenience for event participants and staff; reduction in event staffing needs; elimination of the need to swipe or authorize cards at an event; reduction of non-qualification surcharges that can result from non-timely settlement of credit card authorizations; and, storage of payment information which can also be used for future customer payments unrelated to the event or auction.

Figure 8:
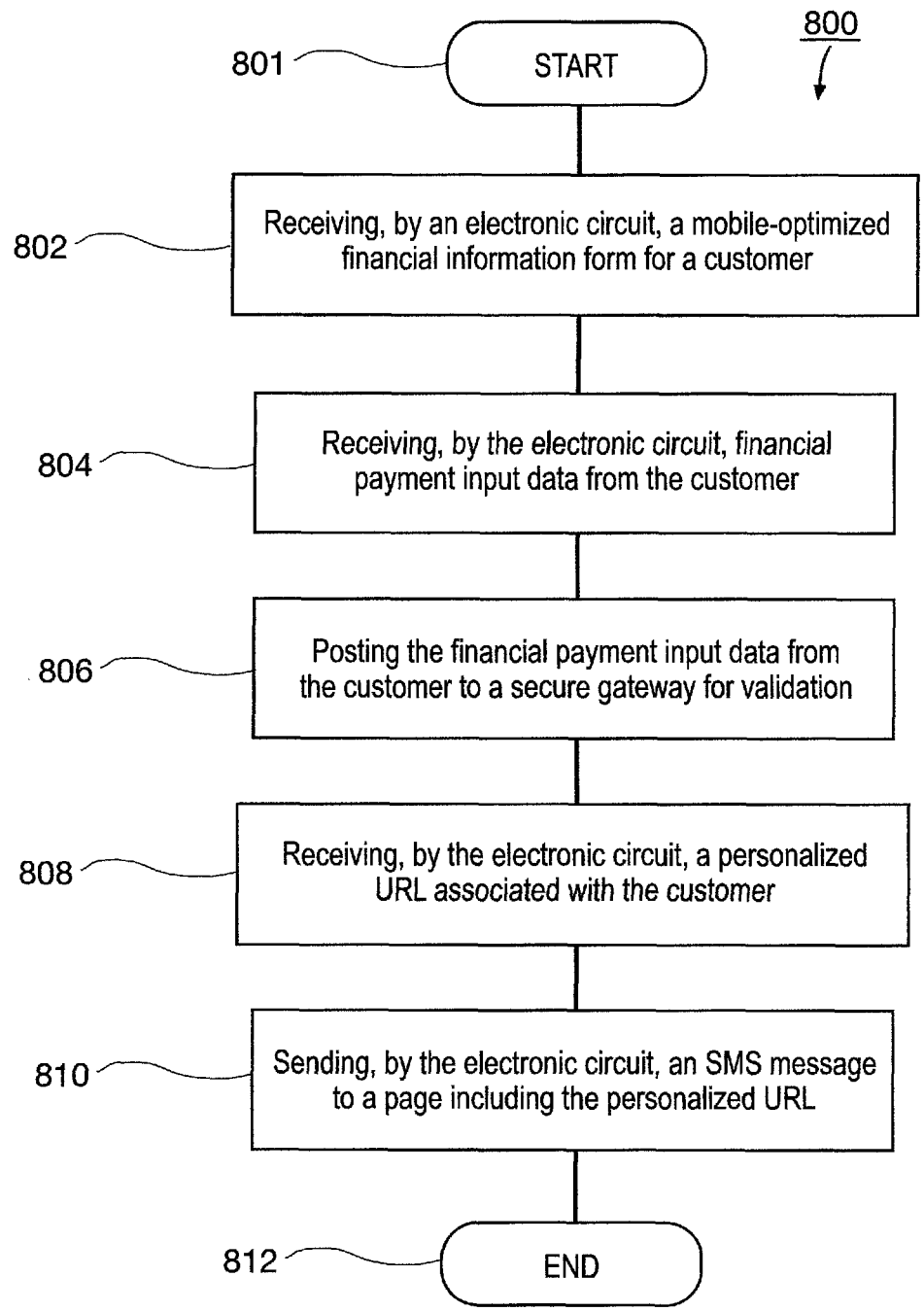
FIG. 8 is a flowchart depicting a method of using a personalized payment hyperlink to register credit card or bank account information for later use, which is useful to understanding an embodiment of the present invention.

In an exemplary embodiment depicted in FIG. 8, a method 800 for registering financial payment information is provided. The process begins at step 801 and proceeds to step 802, where an electronic circuit of a mobile communication device receives a mobile-optimized financial payment information form for a customer, which is then filled in by the customer with financial payment information 804, such as but not limited to credit card information. Next, the financial payment data is posted to a secure gateway for validation 806, and, upon validation, a personalized URL associated with the customer and validated financial payment data is received 808 by the electronic circuit of the mobile device.

In a further embodiment, the personalized URL may then be sent 810, for example by email or an SMS message, to a payee to render payment, completing the process 812.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A payment/information processing method comprising:
   receiving, by an electronic circuit of a mobile communication device, a payment/information processing statement for a customer by a short message service (SMS) message, the payment/information processing statement comprising an online payment/information URL personalized to uniquely identify the customer;
   extracting the online payment/information URL from the SMS message by the electronic circuit;
   accessing a mobile-optimized web page using the online payment/information URL, by the electronic circuit;
   receiving a customer's online payment/information form by the electronic circuit;
   displaying the online payment/information form on the mobile communication device without the customer logging in or preregistering, the online payment/information form comprising data fields pre-populated with available customer information derived from the online payment/information URL;
   completing data in the online payment/information form as needed by the customer; and
   sending the completed online payment/information form to a secure payment form server.

2. The payment/information processing method according to claim 1, further comprising forwarding a payment from the customer to a biller.

3. The payment processing/information processing method according to claim 1, further comprising updating customer information in a database with information from the completed online payment/information form.

4. A method for registering financial payment information comprising:
   receiving, by an electronic circuit of a mobile communication device, a mobile-optimized financial payment information form for a customer;
   receiving, by the electronic circuit, financial payment data input from the customer;
   posting, by the electronic circuit, the financial payment data input from the customer to a secure gateway for validation; and,
   receiving, by the electronic circuit, a personalized URL associated with the customer and validated financial payment data.

5. The method according to claim 4, further comprising:
   sending, by the electronic device, an SMS message to a payee, the SMS message comprising the personalized URL associated with the customer and validated financial payment data.

6. A payment/information processing system comprising:
   a mobile communication device comprising an electronic circuit, display device, input device, and associated electronic memory and power supply, the electronic circuit and memory configured to perform the step of:

receiving a payment/information processing statement for a customer by a short message service (SMS) message, the payment/information processing statement comprising an online payment/information URL personalized to uniquely identify the customer;

extracting the online payment/information URL from the SMS message;

accessing a mobile-optimized web page using the online payment/information URL;

receiving a customer's online payment/information form by the electronic circuit;

displaying the online payment/information form on the display without the customer logging in or preregistering, the online payment/information form comprising data fields pre-populated with available customer information derived from the online payment/information URL;

completing data in the online payment/information form as needed by the customer; and sending the completed online payment/information form to the secure payment form server.

7. The system according to claim 6, further comprising forwarding a payment from the customer to a biller.

8. The system according to claim 6, further comprising updating customer information in a database with information from the completed online payment/information form.

9. The system according to claim 8, wherein the information is financial payment information, further comprising the steps of:

receiving a mobile-optimized financial payment information form for a customer, receiving financial payment data input from the customer;

posting the financial payment data input from the customer to a secure gateway for validation; and, receiving a personalized URL associated with the customer and validated financial payment data.

10. The system according to claim 9, further comprising the step of:

sending an SMS message to a payee, the SMS message comprising the personalized URL associated with the customer and validated financial payment data.

* * * * *